United States Patent
Lanman et al.

(10) Patent No.: US 8,651,678 B2
(45) Date of Patent: Feb. 18, 2014

(54) POLARIZATION FIELDS FOR DYNAMIC LIGHT FIELD DISPLAY

(71) Applicants: Douglas Lanman, Somerville, MA (US); Gordon Wetzstein, Cambridge, MA (US); Matthew Hirsch, Somerville, MA (US); Wolfgang Heidrich, Vancouver (CA); Ramesh Raskar, Cambridge, MA (US)

(72) Inventors: Douglas Lanman, Somerville, MA (US); Gordon Wetzstein, Cambridge, MA (US); Matthew Hirsch, Somerville, MA (US); Wolfgang Heidrich, Vancouver (CA); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/689,631

(22) Filed: Nov. 29, 2012

(65) Prior Publication Data
US 2013/0176704 A1 Jul. 11, 2013

Related U.S. Application Data

(60) Provisional application No. 61/564,855, filed on Nov. 29, 2011.

(51) Int. Cl.
F21V 9/14 (2006.01)
(52) U.S. Cl.
USPC .............................................. 362/19; 349/15
(58) Field of Classification Search
USPC .......... 362/19, 317, 293; 349/15, 77, 83, 193, 349/96; 313/112; 359/487.01, 487.04, 359/487.06
See application file for complete search history.

(56) References Cited

U.S. PATENT DOCUMENTS

| | | | |
|---|---|---|---|
| 5,337,068 A | 8/1994 | Stewart et al. | |
| 5,745,197 A | 4/1998 | Leung et al. | |
| 6,806,849 B2 | 10/2004 | Sullivan | |
| 6,985,290 B2 | 1/2006 | Putilin et al. | |
| 7,342,721 B2 | 3/2008 | Lukyanitsa | |
| 2003/0038922 A1 | 2/2003 | Ferrell | |
| 2003/0086156 A1* | 5/2003 | McGuire, Jr. | 359/352 |
| 2003/0095305 A1* | 5/2003 | Kewitsch et al. | 359/114 |
| 2006/0023987 A1* | 2/2006 | Yao | 385/11 |
| 2007/0035830 A1 | 2/2007 | Matveev et al. | |
| 2008/0150913 A1* | 6/2008 | Bell et al. | 345/175 |
| 2008/0225236 A1* | 9/2008 | Schuck et al. | 353/20 |
| 2012/0140131 A1 | 6/2012 | Lanman et al. | |

OTHER PUBLICATIONS

Gotoda, H., A multilayer liquid crystal display for autostereoscopic 3D viewing. Feb. 2010. In SPIE Stereoscopic Displays and Applications XXI, vol. 7524, 1-8.

(Continued)

Primary Examiner — Nimeshkumar Patel
Assistant Examiner — Glenn Zimmerman
(74) Attorney, Agent, or Firm — Stephen R. Otis

(57) ABSTRACT

In exemplary implementations of this invention, a flat screen device displays a 3D scene. The 3D display may be viewed by a person who is not wearing any special glasses. The flat screen device displays dynamically changing 3D imagery, with a refresh rate so fast that the device may be used for 3D movies or for interactive, 3D display. The flat screen device comprises a stack of LCD layers with two crossed polarization filters, one filter at each end of the stack. One or more processors control the voltage at each pixel of each LCD layer, in order to control the polarization state rotation induced in light at that pixel. The processor employs an algorithm that models each LCD layer as a spatially-controllable polarization rotator, rather than a conventional spatial light modulator that directly attenuates light. Color display is achieved using field sequential color illumination with monochromatic LCDs.

20 Claims, 4 Drawing Sheets

(56) References Cited

OTHER PUBLICATIONS

Gotoda, H., View-Dependent Image Generation From a Multilayer Liquid Crystal Display, Jul. 2010, Proceedings of the 2010 ADIS International Conference on Computer Graphics, Visualization, Computer Vision and Processing, Freiburg, Gernany, pp. 157-164.

Lukianitsa, A., Putilin, A., 2002, Stereodisplay with neural network image processing. In SPIE Stereoscopic Displays and Virtual Reality Systems IX, vol. 4660, 207-211.

Lukianitsa, A., Yarovoy, A., Kanashin, K., 2005, Tri-stack 3D LCD Monitor, in SPIE Stereoscopic Displays and Virtual Reality Systems XII, vol. 5664, 241-246.

Moreno, I., Martinez, J., Davis, J., 2007, Two-dimensional polarization rotator using a twisted-nematic liquid-crystal display. Applied Optics 46, 6, 881-88.

Bell, G. P., Craig, R., Paxton, R., Wong, G., and Gal-Braith, D. 2008. Beyond flat panels: multi-layered displays with real depth. SID Digest 39, 1, 352-355.

Davis, J. A., McNamara, D. E., Cottrell, D. M., and Sonehara, T., 2000, Two-dimensional polarization encoding with a phase-only liquid-crystal spatial light modulator. Applied Optics 39, 10, 1549-1554.

\* cited by examiner

POLARIZATION FIELDS FOR DYNAMIC LIGHT FIELD DISPLAY

RELATED APPLICATIONS

This application is a non-provisional of, and claims the benefit of the filing date of, U.S. Provisional Application Ser. No. 61/564,855, filed Nov. 29, 2011, the entire disclosure of which is herein incorporated by reference.

STATEMENT REGARDING FEDERALLY SPONSORED RESEARCH OR DEVELOPMENT

This invention was made with U.S. government support under Grant Number HS-1116452, awarded by the National Science Foundation, Grant HR0011-10-c-0073, awarded by the Defense Advanced Research Projects Agency (DARPA), and Young Faculty Award N66001-10-1-4041, awarded by DARPA. The government has certain rights in this invention.

FIELD OF THE TECHNOLOGY

The present invention relates generally to polarization.

SUMMARY

In exemplary implementations of this invention, a flat screen device produces a 3D display. The displayed 3D scene appears different at different viewing angles, just as an actual 3D scene does.

The flat screen device creates the illusion of looking into an actual 3D scene—without the viewer wearing special glasses.

In exemplary implementations of this invention, the flat screen device displays dynamically changing 3D imagery. The refresh rate is so fast that the device may be used for 3D movies or for an interactive, 3D display.

As used herein, a "polarization rotator" is a device configured to change the polarization state of light that travels through the device. For example, a polarization rotator may comprise a layer of liquid crystal between a pair of transparent electrodes.

In exemplary implementations of this invention: An illumination source provides light that is transmitted through at least (i) a multi-layered stack of polarization rotators and (ii) a polarizer which is in optically in front of the stack. Each of the polarization rotators is a spatially addressable device—it can dynamically vary, on a pixel by pixel basis, polarization state rotations of light being transmitted through the device.

In exemplary implementations of this invention: One or more processors perform an optimization calculation to compute an optimal set of polarization state rotations induced in light at respective pixels in the polarization rotators. For each respective light ray in a set of light rays, the optimization calculation includes computing a summation of changes to the polarization state rotation of the respective light ray that occur as the respective light ray travels through the stack of polarization rotators.

In some implementations of this invention, the optimization calculation also includes computing, according to Malus' law, an intensity of the respective light ray, the intensity being as of when the respective light ray emerges from the polarizer. Malus' law includes a term that is a square of a sinusoidal function. The optimization calculation may include solving for the argument of the sinusoidal function, using an approximation based on only a single period of the sinusoidal function.

In exemplary implementations of this invention: The apparatus produces an automultiscopic display. The processors output control signals that control and optimize polarization state rotations induced in light at respective pixels of the polarization rotators. As a result, the light field that emerges from the front polarizer is the best approximation of a target light field. For example, if the apparatus is rendering a 3D scene, the optimized polarization state rotations minimize the error between (a) the light field that is outputted from the front polarizer and (b) the light field that would be emitted by the actual 3D scene.

In illustrative implementations of this invention: Each polarization rotator comprises a layer of liquid crystal. The polarization rotators are configured to dynamically vary voltage applied at respective pixels in order to control polarization rotation at the respective pixels.

In some implementations of this invention: (a) the optimization calculation may be a constrained linear least squares optimization calculation; (b) the one or more processors may be configured to employ a SART technique when performing the optimization calculation; and (c) the optimization calculation may be a non-linear optimization calculation.

In exemplary implementations of this invention, the SART algorithm is employed to render dynamically changing 3D imagery at interactive rates.

In exemplary implementations of this invention, computations of the polarization state rotations may be performed in advance or in real time. For example, computations may be performed in real time for an interaction with a human user.

In some implementations of this invention, computations for frames in a movie are performed in advance, and data regarding the computed frames is stored in memory. This data may be played in order to render a 3D movie. The 3D movie may be based on captured multi-view or light field data, or may instead be based on synthetic multi-view or light field data. The stored data may comprise voltage values for controlling polarization state rotations at respective pixels in order to produce the light fields of the frames.

A prototype of this invention comprises a stacked set of liquid crystal panels with a single pair of crossed linear polarizers. One or more processors control the voltage at each pixel of each liquid crystal panel, in order to control the polarization state rotation at that pixel. The processor employs an algorithm that models each LCD layer as a spatially-controllable polarization rotator, as opposed to a conventional spatial light modulator that directly attenuates light.

In this prototype, color display is achieved using field sequential color illumination with monochromatic LCDs. Each of the polarization rotators is monochromatic and the illumination source is a strobe backlight configured to sequentially illuminate the polarization rotators with varying colors of light. Alternately, color display may be achieved by other technologies, including color filter arrays.

In this prototype, processors control the display, at interactive refresh rates, by using a simultaneous algebraic reconstruction technique (SART) algorithm to tomographically solve for the optimal spatially-varying polarization state rotations applied by each layer. Modified off-the-shelf LCD panels are used as polarization rotators.

This prototype achieves increased brightness, higher resolution, and extended depth of field, as compared to conventional display methods for automultiscopic dual-layer and multi-layer LCDs.

The description of the present invention in the Summary and Abstract sections hereof is just a summary. It is intended only to give a general introduction to some illustrative implementations of this invention. It does not describe all of the details of this invention. This invention may be implemented in many other ways.

BRIEF DESCRIPTION OF THE DRAWINGS

FIGS. 2-5 illustrate some illustrative implementations of this invention, or provide information that relates to those implementations. However, this invention may be implemented in many other ways. The above FIGS. 1-5 do not show all of the details of this invention.

DETAILED DESCRIPTION

Figure 1:
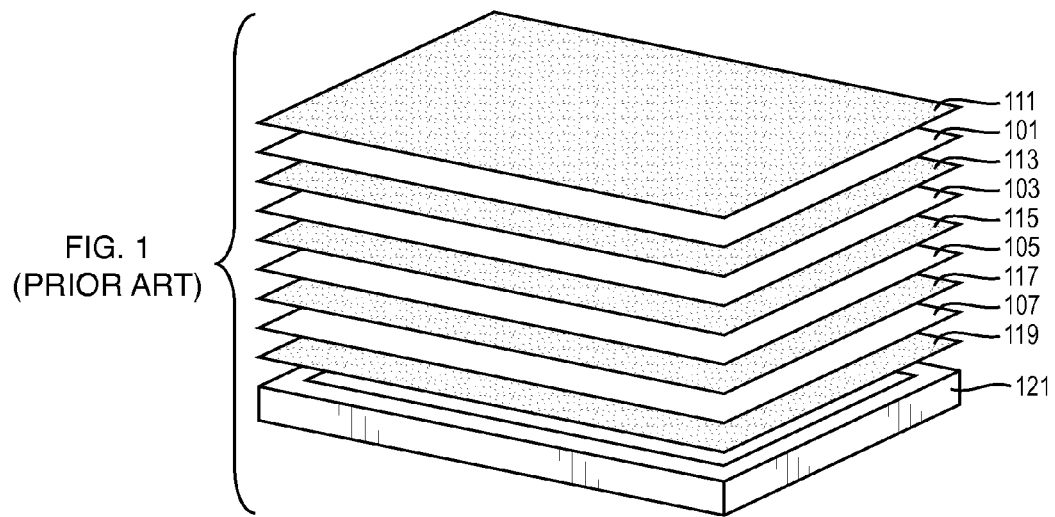
FIG. 1 shows a prior art example of a stack of spatial light attenuators.

FIG. 1 shows an example of a conventional multilayered LCD with four LCD layers 101, 103, 105, 107. Each of these LCD layers comprises a thin liquid crystal layer, enclosed within glass sheets with embedded, two-dimensional electrode arrays. The four LCD layers 101, 103, 105, 107 are sandwiched between five polarizers 111, 113, 115, 117, 119. Polarizers 111, 115, 119 are crossed with polarizers 113, 117. A backlight 121 provides uniform illumination.

In the example shown in FIG. 1, each LCD layer (together with the polarizers immediately adjacent to it) functions as a spatial light attenuator.

Figure 2:
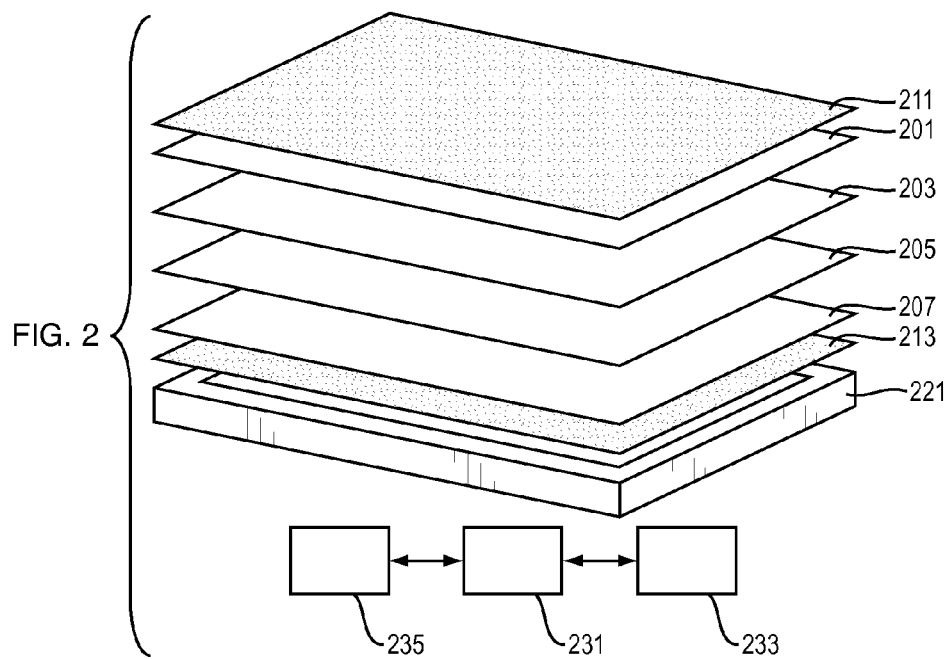
FIG. 2 shows a stack of polarization rotators, in an exemplary embodiment of this invention.

FIG. 2 shows a stack of polarization rotators, in an exemplary implementation of this invention. Similar to FIG. 1, the stack comprises four LCD layers 201, 203, 205, 207 and a backlight 221 for uniform illumination. Each of these LCD layers comprises a thin liquid crystal layer, enclosed within glass sheets with embedded, two-dimensional electrode arrays.

Unlike FIG. 1, there are only two polarizers 211, 213 in FIG. 2, one at each end of the stack. In FIG. 2, each of the LCD layers 201, 203, 205, 207 functions as a polarization rotator, rather than as a spatial attenuator.

Each time that light passes through a polarizer, some of the light is not transmitted (even if the polarized light and polarizer are aligned, and even more so if they are not aligned). Thus, generally speaking, the more polarizers in a stack, the more the light is attenuated as it passes through the stack. Advantageously, a stack of polarization rotators (as in FIG. 2) may have less polarizers than a stack of spatial light attenuators (as in FIG. 1). Thus, a stack of polarization rotators may let more light through (i.e., be more optically efficient) than a stack of spatial attenuators.

In exemplary embodiments of this invention, color 3D displays are achieved by using field sequential color (FSC), rather than a color filter array. A strobed LED backlight successively illuminates a high-speed monochromatic LCD with varying color sources. If strobing occurs faster than the human flicker fusion threshold, a color image is perceived. The color image can be dynamically changed.

In exemplary implementations of this invention, FSC is preferable to a color filter array, because FSC tends to attenuate light less than a color filter array.

In the example shown in FIG. 2, one or more processors 231 are employed to, among other things, process data, perform calculations, and output control signals. The control signals may, among other things, control the strobed LED backlight 221. Also, the control signals may control the voltages applied at respective pixels of the polarization rotators 201, 203, 205, 207, and thus may control the polarization state rotations induced in light being transmitted through the respective pixels.

The calculations by the one or more processors 231 may include optimizing these voltages in order to produce a light field that best approximates a target light field. These calculations may be performed in real time for GPU-based interactions with a human user. Furthermore, one or more memory storage units 233 may be used to store data. The data that is stored may include pre-computed data that can be played in order to render a 3D movie. One or more input devices 235 may be used to accept input from a human user. The one or more processors 231 may be connected by wired or wireless connections to other parts of the display apparatus, including (a) the polarization rotators 201, 203, 205, 207, (b) the strobed LED backlight 221, (c) the one or more memory storage units 233, and (d) the one or more input devices 235. The location of the processors, memory units, and input devices may vary, depending on the particular implementation of this invention. For example, any one or more of the processors, memory units and input devices may be housed with, or located remotely from, the polarization rotators.

In exemplary implementations of this invention, computationally-efficient algorithms control multi-layered LCDs to produce a dynamic, automultiscopic display. A stack of multiple liquid crystal panels is covered with a single pair of crossed linear polarizers, one at each end of the stack. Each liquid display panel functions as a polarization rotator, rather than as a light attenuator. An efficient tomographic solver enables interactive applications and practical dynamic light field display. The polarization field displays achieve increased brightness, higher resolution, and extended depth of field, compared to conventional automultiscopic multilayer LCDs that function as a stack of spatial light attenuators.

In exemplary implementations of this invention, an algorithm models a polarization-based light field display as a constrained linear least-squares problem, and solves the problem using a simultaneous algebraic reconstruction technique (SART), allowing dynamic light field display.

According to principles of this invention, SART may be used for optimization for dynamic light field display for both polarization-based and attenuation-based multi-layer LCD architectures.

A prototype of this invention employs field sequential color, a pair of crossed polarizers, and layered, monochromatic LCDs. The LCD layers comprise modified off-the-shelf LCD panels. This prototype achieves interactive display with dynamic imagery using a GPU-based SART solver.

In exemplary implementations, the GPU-based SART solver enable control of either attenuation-based or polarization-based displays at interactive refresh rates. The display may reproduce only a central zone. In that case, tracking (e.g., gaze-tracking may be used for wider fields of view.

As is well known in the art, the transformation of polarized light due to passage through layered materials may be modeled by Jones calculus. In this approach, orthogonal components of the electric field are represented as a complex-valued Jones vectors. The optical action of a given element (e.g., a birefringent layer or polarizing film) is represented by a Jones matrix, with the product of this matrix and a Jones vector encoding the polarization state transformation. Jones calculus may be used to characterize polarization properties of LCD panels. For example, analytic Jones matrices may characterize twisted nematic (TN), vertical alignment (VA), and in-plane switching (IPS) panels.

In some implementations of this invention, processors employ a simplified Jones matrix model, wherein LCDs are approximated as spatially-controllable polarization rotators. This simplified matrix model assumes that light outputted from each LCD panel is linearly polarized. However, conventional LCDs actually output light that is slightly elliptical. As a result, if the simplified matrix model is used with conventional LCD panels, then visual artifacts may appear in the display. There are at least two solutions to this problem. In exemplary implementations of this invention, either or both of these two solutions may be used. First, the LCD panels may be engineered to output light that conforms to the simplified matrix model. For example, compensation films may be employed to correct the output of each LCD panel, so that light outputted from each panel is linearly polarized. Second, a more detailed Jones matrix model of the LCD panels may be employed. A benefit of this second approach is that it can better model actual light transmission through the stack, and thus may reduce visible artifacts. A drawback of this second approach is that it increases computational complexity and thus may lead to decreased refresh rates.

In exemplary implementations, the liquid crystal is operated as a voltage-controlled wave plate to produce polarization state rotations. Layered constructions of such panels are ideally suited to implement practical polarization field displays.

In exemplary implementations of this invention, applying a voltage across an electrode pair (on either side of a liquid crystal layer) alters the polarization properties of a pixel. According to principles of this invention, the effect can be approximated as inducing a rotation of the polarization state of light rays traversing the pixel. This approximation holds to varying degrees of accuracy under different actual conditions.

In exemplary implementations, the transmitted intensity I that passes through the front polarizer (at the end of the stack closest to the observer) is modeled by Malus' law $$I = I_0 \sin^2(\theta) \quad \text{(Eq. 1)}$$

where $I_0$ is the intensity after passing through the first polarizer and $\theta$ is angle of polarization after passing through the liquid crystal layer closest to the front polarizer, defined relative to the axis of the front polarizer. This model only strictly applies for rays oriented perpendicular to the display surface. At oblique angles, light leakage occurs through crossed polarizers and birefringence of the liquid crystal produces elliptical, rather than linear, polarization states. However, this model is a close approximation for the viewing angles considered in the prototype.

In exemplary implementations of this invention, a 3D scene is displayed. A front polarizer adjacent to multi-layer LCDs outputs a light field that approximates the light field that would be emitted by the actual 3D scene.

In the example shown in FIG. 2 (an exemplary implementation of this invention) a backlight 221 is covered by multiple, disjoint spatial light modulators 201, 203, 205, 207. To maximize optical efficiency, field sequential color illumination is used; this eliminates K layers of color filters that would otherwise cause severe moire and brightness attenuation. Only two polarizing films 211, 213 are used, one on the top and bottom of the multi-layer stack. This creates a polarization field display, wherein each spatial light modulator comprises a liquid crystal layer functioning as a spatially-addressable voltage-controlled polarization rotator.

In exemplary implementations, such displays are controlled so the polarization field incident on the front polarizer (closest to the observer) accurately reproduces the target light field.

Figure 3:
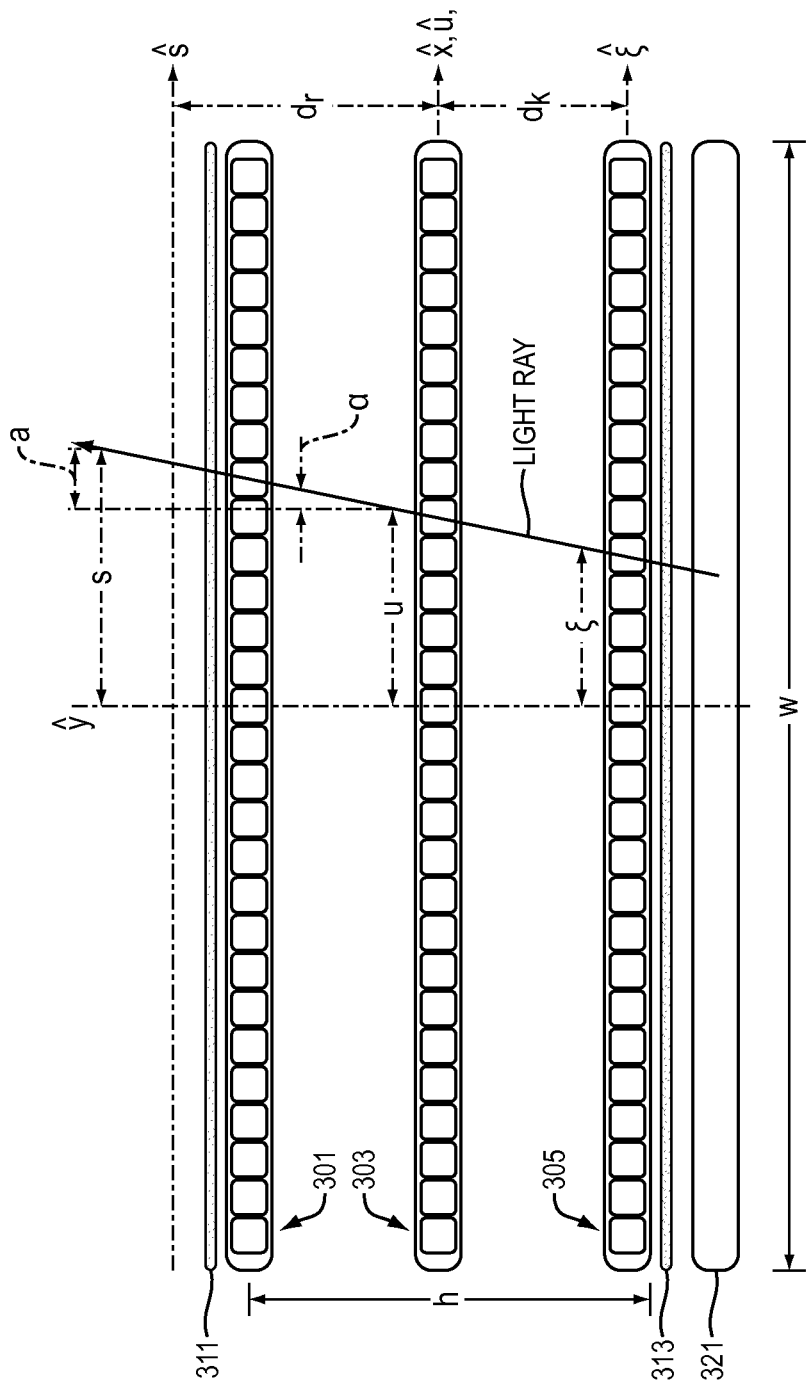
FIG. 3 is a diagram showing a light ray traveling through a stack of polarization rotators.

FIG. 3 is a diagram of a polarization field display, in an exemplary implementation of this invention. A K-layer display is constructed by separating multiple liquid crystal panels 301, 303, 305. The stack of panels is surrounded by two crossed polarizers: a front polarizer 311 and a rear polarizer 313. The light field $l_0(u,a)$ emitted by the backlight 321 is linearly polarized by the rear polarizer 313. The polarization state of ray (u,a) is rotated by $\phi_k(\xi)$ after passage through layer k, where $\xi = u + (d_k/d_r)a$. The emitted light field $\tilde{l}(u,a)$ is given by applying Equation 2 to the emitted polarization field $\tilde{\theta}(u,a)$ upon passage through the front polarizer 311.

The following is an analysis of light passing through a K layer stack of polarization rotators. For ease of discussion, this analysis is in flatland, considering 1D layers and 2D light fields, with a direct extension to 2D layers and 4D light fields. As shown in FIG. 3, consider a display of width w and height h, with K layers distributed along the y-axis such that $d_k \in [-h/2, h/2]$. Use a two-plane light field parameterization $l(u,a)$. The u-axis is coincident with the x-axis and the slope of ray (u,a) is defined as $a = s - u = d_r \tan(\alpha)$, where the s-axis is a distance $d_r$ from the u-axis.

The emitted light field $l(u,a)$ is given by applying Equation 1 to the polarization field $\theta(u,a)$ incident on the front polarizer (closest to the observer):

$$l(u,a) = l_0(u,a)\sin^2(\theta(u,a)) \quad \text{(Eq. 2)}$$

where $l_0(u,a)$ is the light field produced by the backlight after attenuation by the rear polarizer. The backlight is assumed to be uniform such that $l_0(u,a) = l_{max}$ and the light field is normalized such that $l(u,a) \in [0, l_{max}]$. This expression is used to solve for the target polarization field $\theta(u,a)$, as follows.

$$\theta(u,a) = \pm \sin^{-1}\left(\sqrt{\frac{l(u,a)}{l_0(u,a)}}\right) \mod \pi \quad \text{(Eq. 3)}$$

Under these assumptions, the principal value of the arcsine ranges over $[0, \pi/2]$. Note, with full generality, the target polarization field is multi-valued and periodic, since a rotation of $\pm \theta \mod \pi$ radians will produce an identical intensity by application of Malus' law.

Each layer controls the spatially-varying polarization state rotation $\phi_k(\xi)$, as induced at point $\xi$ along layer k. Ray (u,a) intersects the K layers, accumulating incremental rotations at each intersection, such that the emitted polarization field $\tilde{\theta}(u,a)$ is given by $$\tilde{\theta}(u,a) = \sum_{k=1}^{K} \phi_k(u + (d_k/d_r)a) \quad \text{(Eq. 4)}$$

Combining Equations 2 and 4 yields the following model for the light field $\tilde{l}(u,a)$ emitted by a K-layer polarization field display:

$$\tilde{l}(u,a) = l_0(u,a)\sin^2\left(\sum_{k=1}^{K} \phi_k(u + (d_k/d_r)a)\right) \quad \text{(Eq. 5)}$$

In exemplary implementations, the voltage applied to the respective pixels in a multi-layer LCDs is optimized for polarization field display. In particular, when rendering a 3D scene, the voltage applied to the respective pixels is optimized so that the light field transmitted from the front polarizer in the stack (closest to the observer) approximates the light field that would be transmitted (through the area of the screen if the screen were absent) by the actual 3D scene.

Consider a discrete parameterization for which the emitted polarization field is represented as a column vector $\tilde{\theta}$ with M elements, each of which corresponds to the angle of polarization for a specific light field ray. Similarly, the polarization state rotations are represented as a column vector $\phi$ with N elements, each of which corresponds to a specific display pixel in a given layer. Under this parameterization, Equation 4 yields a linear model such that $$\tilde{\theta}_m = \sum_{n=1}^{N} P_{mn} \phi_n \quad \text{(Eq. 6)}$$

where $\tilde{\theta}_m$ and $\phi_n$ denote ray m and pixel n of $\tilde{\theta}$ and $\phi$, respectively. An element $P_{mn}$ of the projection matrix P is given by the normalized area of overlap between pixel n and ray m, occupying a finite region determined by the sample spacing.

In exemplary implementations of this invention, an optimal set of polarization state rotations $\phi$ is found by solving the following constrained linear least-squares problem:

$$\arg\min_{\phi} \|\theta - P\phi\|^2, \quad \text{(Eq. 7)}$$

$$\text{for } \phi_{min} \leq \phi \leq \phi_{max}$$

where each layer can apply a rotation ranging over $[\phi_{min}, \phi_{max}]$. Equation 7 can be solved by a variety of techniques, including (1) a sparse, constrained, large-scale trust region method or (2) a simultaneous algebraic reconstruction technique (SART). However, the problem can be solved more efficiently by SART than by the trust region approach.

In exemplary implementations of this invention, SART provides an iterative solution wherein the estimate $\theta^{(q)}$ at iteration q is given by $$\phi^{(q)} = \phi^{(q-1)} + v \circ (P^T(w \circ (\theta - P\phi^{(q-1)}))), \quad \text{(Eq. 8)}$$

where $\circ$ denotes the Hadamard product for element-wise multiplication and elements of the w and v vectors are given by $$w_m = \frac{1}{\sum_{n=1}^{N} P_{mn}} \quad \text{(Eq. 9)}$$

and $$v_n = \frac{1}{\sum_{m=1}^{M} P_{mn}}$$

After each iteration, additional constraints on $\phi^{(q)}$ are enforced by clamping the result to the feasible rotation range. SART rapidly converges to a solution approaching the fidelity of that produced by alternative iterative methods, including trust region and conjugate gradient descent techniques. SART allows for real-time optimization for interactive polarization field displays.

According to principles of this invention, polarization fields present both an optically and computationally efficient architecture for dynamic light field display using multi-layer LCDs.

In alternate implementations of this invention, SART is be used to control a multi-layered, attenuation-based display. The attenuation-based display is fabricated by placing a polarizer on the backlight and additional polarizers after each liquid crystal layer, effectively creating a set of dynamically-programmable transparencies. SART is applied to attenuation layers by substituting the logarithm of the emitted light field intensity $\tilde{l}_m$ the logarithm of the transmittance $t_n$ for $\tilde{\theta}_m$ and $\phi_n$ in Equation 6, respectively.

In a prototype of this invention, monochromatic layers and field sequential color are employed. Each layer of this prototype comprises a modified Barco® E-2320 PA LCD, supporting a 1600×1200 8-bit grayscale display at 60 Hz, and an active area of 40.8×30.6 cm. In this prototype, the liquid crystal layer is separated from the case, backlight, and power supply. To modify the Barco® LCD, polarizing films were removed and the adhesive was dissolved with acetone. The Barco® LCD was also modified by constructing an extended ribbon cable that allows the driverboard to be folded above the display using a pair of 20-pin connectors and a flat flexible cable. (This modification to the Barco® LCD was desirable because, in the unmodified Barco® LCD, the driver board is folded behind the panel, and would have blocked a portion of the display when used in the stacked configuration of this prototype)

In this prototype, the exposed panel, driver boards, and power supply are mounted to a waterjet-cut aluminum frame. Four such panels were constructed and stacked on a wooden stand. Arbitrary layer spacings are supported by translating the frames along rails. Acrylic spacers hold the layers at a fixed spacing of 1.7 cm for all experiments described in this paper, yielding a total display thickness of 5.1 cm. The prototype is illuminated using an interleaved pair of backlights and controlled by a 3.4 GHz Intel Core® i7 workstation with 4 GB of RAM. A four-head NVIDIA® Quadro® NVS 450 graphics card synchronizes the displays.

This prototype operates in either attenuation-based or polarization-based modes. The original polarizers were discarded and replaced with AP38-006T linear polarizers (obtained from American Polarizers, Inc., Reading, Pa.). By specification, a single polarizer has a transmission efficiency of 38% for unpolarized illumination. Transmission is reduced to 30% through a pair of aligned polarizers, yielding an efficiency of 80% for polarized light passing through a single, aligned polarizer. Five polarizers are required for attenuation-based display, with a pair of crossed polarizers on the rear layer followed by successively-crossed polarizers on each remaining layer. A polarization field display is implemented by enclosing the stack by a single pair of crossed polarizers.

In this prototype, field sequential color is simulated, for still imagery, by combining three photographs taken while alternating the color channel displayed on each layer.

In this prototype, each panel is radiometrically calibrated to allow an accurate mapping from optimized rotation angles to displayed image values. The Barco® E-2320 PA is intended for medical diagnostic imaging and replicates the DICOM (Digital Imaging and Communications in Medicine) Grayscale Standard Display Function. The normalized displayed intensity $I\epsilon[0,1]$ was measured as a function of the 8-bit image value $v\epsilon[0,255]$ using a photometer held against an unmodified panel. The resulting radiometric response curve is approximated by a gamma value of γ=3.5 such that I=(v/255)^γ. Thus, gamma compression maps optimized pixel transmittances to image values when operating in the attenuation-based mode. When operated as a polarization field display, optimization yields the polarization state rotation φ for each pixel. For an LCD panel enclosed by two polarizers (e.g., the original unmodified BARCO panel), this mapping is modeled by Equation 1 such that I=sin²(φ). Equating this with the gamma curve yields the following mapping between rotations and image values.

$$v(\phi) = \lfloor 255 \sin^{2/\gamma}(\phi) + 0.5 \rfloor \quad \text{(Eq. 10)}$$

In this prototype, the light fields may be rendered with a spatial resolution of 512×384 pixels and may depict 3D scenes with both horizontal and vertical parallax from 7×7 viewpoints within a field of view of 10 degrees. POV-Ray (Persistence of Vision Raytracer) is used to render the scenes. During the process of computing the rendering, a 4D antialiasing filter is applied to the light fields by rendering each view with a limited depth of field. This antialiasing filter simultaneously approximates the limited depth of field established for multi-layer light field displays.

In this prototype, Equation 7 is solved by using either a large-scale trust region or SART.

For example, this prototype can employ a Matlab® LSQLIN solver to solve Equation 7, implementing a sparse, constrained, large-scale trust region method. This solver converges in about 8 to 14 iterations for three to five attenuating or polarization-rotating layers. Solutions are found within approximately 10 minutes on the previously-described Intel Core® i7 workstation.

Or, for example, this prototype can implement the SART algorithm given by Equation 8, using Matlab® and on the GPU (graphical processing unit). Advantageously, SART is well-suited for parallel processing on programmable GPUs. In the prototype, the software code is programmed in C++, OpenGL, and Cg (C for Graphics). Light fields are rendered and antialiased in real-time using OpenGL, followed by several iterations of the GPU-based SART implementation. Using SART, this prototype achieves refresh rates of up to 24 frames per second using one iteration for four layers running on the NVIDIA® Quadro® NVS 450. In a trial of the prototype, the SART converged rapidly, with 2 to 5 iterations minimizing reconstruction artifacts. Estimates for the previous frame may seed the optimization for the current frame. For static scenes, this effectively implements an increasing number of SART iterations over time, while providing a suitable initialization for successive frames in a dynamic environment.

This prototype achieves automultiscopic display. However, this prototype exhibits artifacts not predicted by simulations. Moire is present, although it could be mitigated. Without being limited by theory, it appears that: (a) intensity artifacts arise from discrepancies between the prototype and ideal construction using polarization-rotating layers (including, apparently, the presence of multiple liquid crystal domains in the panels); and (b) the commercial panels used in the prototype do not operate precisely as two-dimensional polarization rotators, particularly at oblique angles.

In a trial of this prototype, a photometer measured the normalized intensity I as differing image values $v_1$ and $v_2$ were displayed on the rear and front layer, respectively. Substituting Equation 10 into Equation 5 yields the following prediction.

$$I(v_1, v_2) = \sin^2\left\{\sin^{-1}\left[\left(\frac{v_1}{255}\right)^{\gamma/2}\right] + \sin^{-1}\left[\left(\frac{v_2}{255}\right)^{\gamma/2}\right]\right\} \quad \text{(Eq. 11)}$$

In this trial of this prototype, measured intensities were nearly identical to this prediction (upon interchanging $v_1$ and $v_2$), validating the additive model in Equation 4. Measured contrast is limited when $v_1$ and $v_2$ are large. Visual artifacts persist in this prototype. Without being limited by theory, these artifacts appear to be due to differences between off-the-shelf panels and ideal polarization rotators.

Polarization fields can accurately present objects beyond the display, but can also be operated in a volumetric mode enclosing the scene for reduced errors.

In trials, polarization fields (in a prototype of this invention) perform comparably to attenuation layers in terms of reconstruction fidelity. Yet, halo artifacts are noticeably reduced. Without being limited by theory, this may be attributable primarily to different biases introduced by least-squares optimization of transformed objective functions. Attenuation-based displays optimize an objective, reminiscent of Equation 7, defined for the logarithm of the target intensities. This penalizes artifacts in dark regions, leading to the observed halos. By comparison, polarization fields (in a prototype of this invention) optimize an objective defined for target intensities transformed by Equation 3; this transformation is more linear than for attenuation, thereby mitigating halos.

In exemplary implementations of this invention, polarization fields have several notable benefits over existing automultiscopic displays, particularly those supporting relatively thin form factors. Polarization fields compare favorably to attenuation layers: among other things, polarization fields may have increased optical efficiency and reduced reconstruction artifacts, as compared to attenuation layers. Both methods significantly improve upon parallax barriers and integral imaging, presenting imagery with greater spatial resolution, increased brightness, and extended depth of field.

Artifacts observed in a prototype of this invention are not predicted by the polarization rotator model. Without being limited by theory, it appears that the artifacts can be primarily attributed to the presence of multiple liquid crystal domains in the in-plane switching (IPS) panels used in the prototype. According to principles of this invention, a multi-domain LCD model that employs Jones calculus may account for the artifacts.

The Jones matrix modeling an LCD depends on its architecture. Yet, all LCDs are fundamentally retardation-based and can be approximated as rotated half-wave plates, with Jones matrix:

$$J_{HWP}(\alpha) = \begin{pmatrix} \cos(2\alpha) & \sin(2\alpha) \\ \sin(2\alpha) & -\cos(2\alpha) \end{pmatrix} \quad \text{(Eq. 12)}$$

where α is the liquid crystal director angle.

Compared to a true polarization rotator, each LCD acts as a pseudo-rotator: reversing the polarization state and doubling the rotation angle. The following expression models the normalized intensity for K-layer compositions of single-domain LCDs enclosed by crossed linear polarizers:

$$I_{HWP-K-1}(\alpha) = I_0 \left| (0\ 1) \left( \prod_{k=1}^{K} J_{HWP}(\alpha_{K-k+1}) \right) \begin{pmatrix} 1 \\ 0 \end{pmatrix} \right|^2 \quad \text{(Eq. 13)}$$

$$= I_0 \sin^2 \left( \sum_{k=1}^{K} (-1)^{k-1} 2\alpha_k \right)$$

For the choice $\alpha_k = (-1)^{k-1} \phi_k/2$, this expression is identical to Equation 5. Thus, under this model, multi-layer, single-domain LCDs can approximate layered polarization rotators.

Assume every IPS pixel is divided into two domains. Each domain i in layer k is approximated as a rotated half-wave plate $J_{HWP}(\alpha_k^{(i)})$ with symmetric directors such that $\alpha_k^{(1)} = -\alpha_k^{(2)} = \alpha$. When the angle between the linear polarizers is not a multiple of 90 degrees, the normalized intensity for a single multi-domain panel differs from Equation 13.

For a multi-layer, multi-domain LCD, rays emitted by the backlight will pass through a single domain in each layer. Considering a bundle of rays passing through a local region, the intensity will depend on the weighted average due to passing through all domain combinations. Summing over combinations yields the following expression for normalized intensity for two-layer, two-domain LCDs.

$$I_{HWP-2-2}(\alpha_1, \alpha_2) = \frac{I_0}{4} \sum_{i=1}^{2} \sum_{j=1}^{2} \quad \text{(Eq. 14)}$$

$$\left| (0\ 1) J_{HWP}(\alpha_2^{(j)}) J_{HWP}(\alpha_1^{(i)}) \begin{pmatrix} 1 \\ 0 \end{pmatrix} \right|^2$$

$$= I_0 \left( \frac{\sin^2(2(\alpha_1 + \alpha_2)) + \sin^2(2(\alpha_1 - \alpha_2))}{2} \right)$$

Without being limited by theory: (a) Equation 14 provides intuition into how multi-layer, multi-domain LCDs deviate from polarization rotators; (b) the first term is proportional to Equation 5, whereas the second term constitutes the error under a polarization rotator approximation.

Extending this analysis to four layers yields the following expression.

$$I_{HWP-4-2}(\alpha) = I_0 \left( \frac{1 - \prod_{k=1}^{4} \cos(4\alpha_k)}{2} \right) \quad \text{(Eq. 15)}$$

Also, extending the analysis to four-layer LCDs yields the following expression for the normalized intensity $I_{HWP-4-2}(\alpha_1, \alpha_2, \alpha_3, \alpha_4)$ when enclosing such displays with two crossed linear polarizers, one at each end of the stack:

$$I_{HWP-4-2}(\alpha_1, \alpha_2, \alpha_3, \alpha_4) = \quad \text{(Eq. 16)}$$

$$\frac{I_0}{16} \sum_{i=1}^{2} \sum_{j=1}^{2} \sum_{k=1}^{2} \sum_{l=1}^{2}$$

$$\left| (0\ 1) J_{HWP}(\alpha_4^{(l)}) J_{HWP}(\alpha_3^{(k)}) J_{HWP}(\alpha_2^{(j)}) J_{HWP}(\alpha_1^{(i)}) \begin{pmatrix} 1 \\ 0 \end{pmatrix} \right|^2 =$$

$$\frac{I_0}{8} [\sin^2(2(\alpha_1 + \alpha_2 + \alpha_3 + \alpha_4)) + \sin^2(2(-\alpha_1 + \alpha_2 + \alpha_3 + \alpha_4)) +$$

-continued $$\sin^2(2(\alpha_1 - \alpha_2 + \alpha_3 + \alpha_4)) + \sin^2(2(\alpha_1 + \alpha_2 - \alpha_3 + \alpha_4)) +$$
$$\sin^2(2(\alpha_1 + \alpha_2 + \alpha_3 - \alpha_4)) + \sin^2(2(\alpha_1 - \alpha_2 - \alpha_3 + \alpha_4)) +$$
$$\sin^2(2(\alpha_1 - \alpha_2 + \alpha_3 - \alpha_4)) + \sin^2(2(\alpha_1 + \alpha_2 - \alpha_3 - \alpha_4))]$$

As before, it is assumed the domains are symmetrically oriented on each layer (i.e., $\alpha_k^{(1)} = -\alpha_k^{(2)} = \alpha_k$). In practice, it is desirable for each term to be weighted by the likelihood of traversing the corresponding combination of domains (depending on the geometric arrangement and scattering properties of the panels). Equation 16 assumes equal weighting. Without being limited by theory: (a) the first term in Equation 16 corresponds to a desirable multi-layer polarization rotator model, and (b) the remaining terms in Equation 16 constitute artifacts introduced by multi-domain LCD panels, compared to the desired implementation. Equation 16 accurately predicts the artifacts exhibited by the prototype.

The polarization rotator approximation deviates from both trials of a prototype of this invention and the multi-domain model (particularly for large image values). For small image values or cases for which values are large for a single layer, measurements and the multi-domain model are well approximated.

Without being limited by theory, it appears that the presence of multiple domains is the primary source of artifacts in a prototype of this invention. This insight reveals solutions. Since the multi-domain model accurately predicts experimental artifacts, it may be used for an enhanced optimization procedure. However, Equation 15 is non-linear and not directly amenable to real-time optimization via the SART algorithm. Alternatively, replacing panels with single-domain alternatives better approximates polarization rotators (as predicted by Equation 13). In practice, both strategies may be pursued, together with laboratory characterizations, to obtain better performance of polarization field displays.

In a prototype of this invention, software that employs SART is programmed in C++ and uses OpenGL and Cg shaders. The algorithm assumes a light field with N distinct views and K layers positioned at user-defined depths along the optical axis. Intermediate quantities, including the target light field views and temporary variables storing weights and layer patterns, are internally rendered into 16-bit off-line framebuffers (e.g., framebuffer objects (FBOs)) before the optimized patterns are displayed on the individual polarization-rotating layers. Only three separate Cg fragment programs are used, each performing the action implied by their names.

Figure 4:
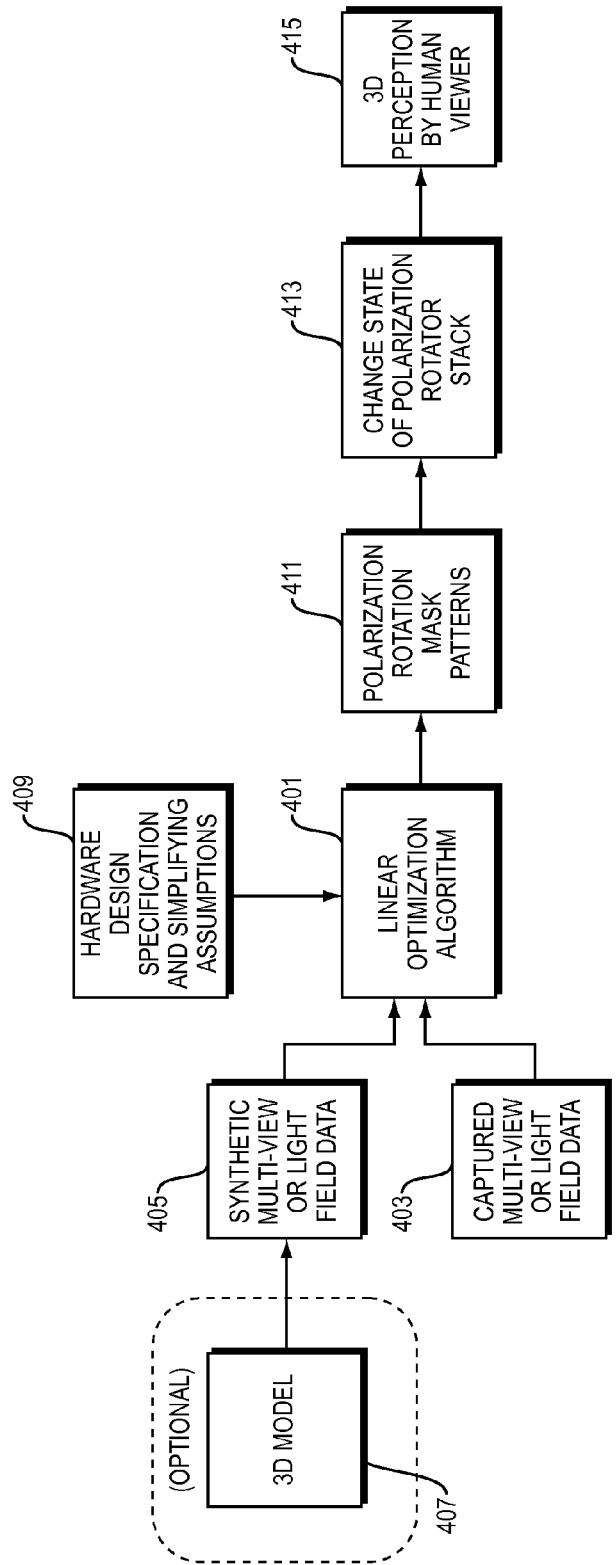
FIG. 4 is a flow chart for controlling a stack of polarization rotators with a linear optimization algorithm.

FIG. 4 is a flow chart for controlling a stack of polarization rotators with a linear optimization algorithm. As shown in FIG. 4, a processor may perform a linear optimization algorithm 401 to optimize rotation polarization states at respective pixels in the stack, in order to render a light field that best approximates a target light field. The linear approximation algorithm 401 may process either (a) captured multi-view or light field data 403, or (b) synthetic multi-view or light field data 405. Optionally, the processor may use a 3D model 407 in order to create the synthetic data 405. The design of the linear optimization algorithm takes into account hardware specifications of the multi-layer LCD stack, with simplifying assumptions 409. Using the linear optimization algorithm 401, the processor outputs polarization rotation mask patterns 411 or control signals to achieve these patterns. The state of the polarization rotator stack is accordingly changed 413. A human viewer looking at the display perceives a 3D display 415.

Figure 5:
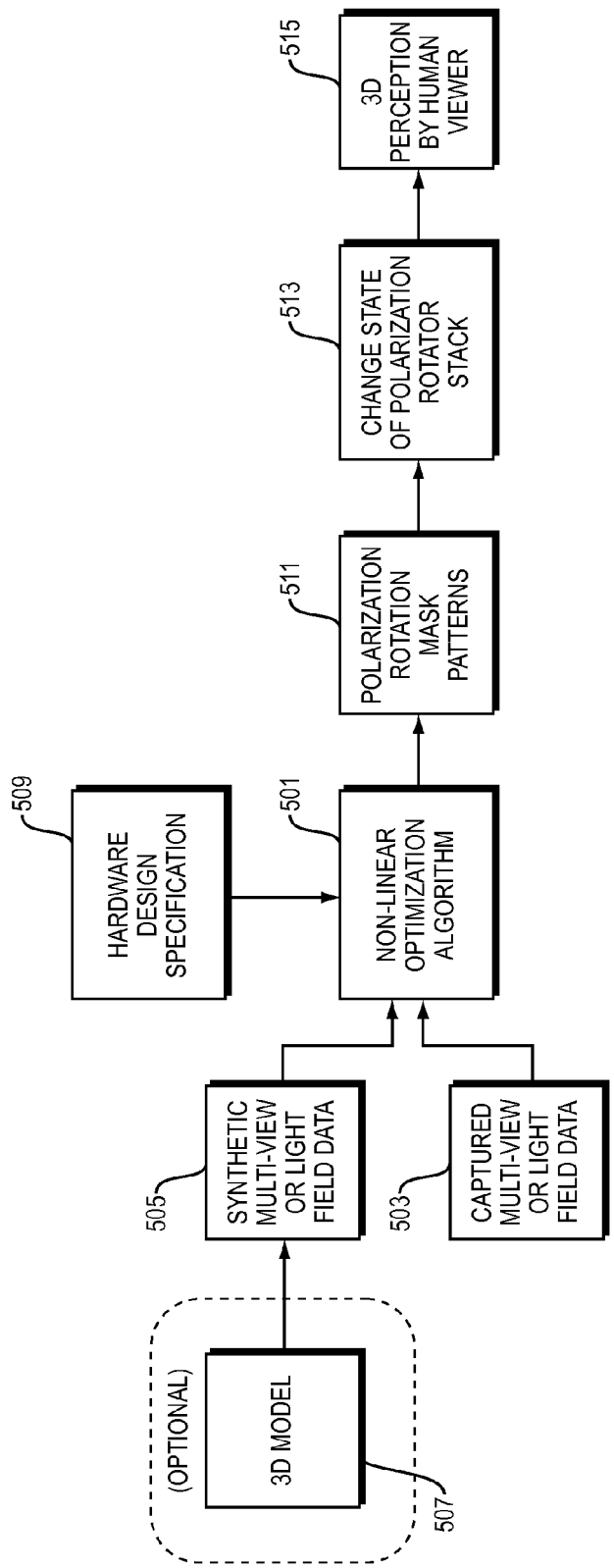
FIG. 5 is a flow chart for controlling a stack of polarization rotators with a non-linear optimization algorithm.

FIG. 5 is a flow chart for controlling a stack of polarization rotators with a non-linear optimization algorithm (rather than a linear optimization program). As shown in FIG. 5, a processor may perform a non-linear optimization algorithm 501 to optimize rotation polarization states at respective pixels in the stack, in order to render a light field that best approximates a target light field. The non-linear approximation algorithm 501 may process either (a) captured multi-view or light field data 503, or (b) synthetic multi-view or light field data 505. Optionally, the processor may use a 3D model 507 in order to create the synthetic data 505. The design of the non-linear optimization algorithm takes into account hardware specifications of the multi-layer LCD stack 509. Using the non-linear optimization algorithm 501, the processor outputs polarization rotation mask patterns 511 or control signals to achieve these patterns. The state of the polarization rotator stack is accordingly changed 513. A human viewer looking at the display perceives a 3D display 515.

In the examples shown in FIGS. 4 and 5, the optimization calculation 401, 501 may compute an optimal set of polarization state rotations induced in light at respective pixels in the polarization rotators. For each respective light ray in a set of light rays, the optimization calculation 401, 501 may include computing a summation of changes to the polarization state rotation of the respective light ray that occur as the respective light ray travels through the stack of polarization rotators. Also, for example, an optimization calculation 401 may include computing, according to Malus' law, an intensity of the respective light ray, the intensity being as of when the respective light ray emerges from the polarizer. Malus' law includes a term that is a square of a sinusoidal function. An optimization calculation 401 may include solving for the argument of the sinusoidal function, using an approximation based on only a single period of the sinusoidal function.

In exemplary implementations of this invention, light emerging from the front polarizer produces an automultiscopic display.

Definitions and Clarifications:

Here are a few definitions and clarifications. As used herein:

The terms "a" and "an", when modifying a noun, do not imply that only one of the noun exists.

An "automultiscopic" display is a display by a flat screen device of a 3D image, which display, when viewed by a human not wearing glasses or other optical apparatus: (a) exhibits motion parallax and binocular parallax, and (b) includes multiple views, the view seen depending on the angle at which the image is viewed.

The term "comprise" (and grammatical variations thereof) shall be construed broadly, as if followed by "without limitation". If A comprises B, then A includes B and may include other things.

The term "e.g." means including without limitation.

To minimize the "error" between two things is to minimize a measure of or based on the difference between the two things. For example, a solution to a linear least squares problem may minimize the error between an actual and a target light field.

The fact that an "example" or multiple examples of something are given does not imply that they are the only instances of that thing. An example (or a group of examples) is merely a non-exhaustive and non-limiting illustration.

In the context of a display device (and components of the device), "front" is optically closer to a viewer, and "rear" is optically further from the viewer, when the viewer is viewing a display produced by the device during normal operation of the device. The "front" and "rear" of a display device continue to be the front and rear, even when no viewer is present. A stack of polarization rotators is a display device or a component of a display device; thus, a stack of polarization rotators has a "front" and a "rear".

The term "include" (and grammatical variations thereof) shall be construed broadly, as if followed by "without limitation".

Intensity" shall be construed broadly to include any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

The term "Malus' law" shall be construed broadly to include any formulation of that law and any computation equivalent to that law. For example, the term "Malus' law" includes a sine squared version and a cosine squared version of that law. Equation 1 above ($I=I_0\sin^2(\theta)$) is a version of Malus' law.

The term "or" is an inclusive disjunctive. For example "A or B" is true if A is true, or B is true, or both A or B are true.

"Parallax" includes binocular parallax and motion parallax. A display exhibits binocular parallax, if the apparent position of an object viewed by the left eye and the right eye of a human viewer differs because of the different positions of the two eyes. A display exhibits motion parallax, if the apparent position of an object appears to change as the viewpoint of the human viewer moves (e.g., by moving the viewer's head).

A parenthesis is simply to make text easier to read, by indicating a grouping of words. A parenthesis does not mean that the parenthetical material is optional or can be ignored.

To vary something "per pixel" means to vary it at respective pixels.

A "pixel" includes the smallest addressable element in a display device. For example, a light-transmitting or light-emitting display device may have pixels.

A "polarization rotator" is a device configured to change the polarization state of light that travels through the device. For example, a polarization rotator may comprise a layer of liquid crystal between a pair of transparent electrodes. Or, for example, any device that alters the polarization state rotation of light passing through the device is a polarization rotator.

The term "polarization state rotation" shall be construed broadly. For example, the term includes a rotation of the angle of polarization of linearly polarized light.

The term "polarizer" means a device that filters light according to the light's polarization state. For example, a polarizing diffuser is a "polarizer".

A "sinusoidal" function includes a sine function and a cosine function.

"SART" means simultaneous algebraic reconstruction technique.

Variations:

This invention may be implemented in many different ways. Here are some non-limiting examples.

In exemplary implementations of this invention, additional elements may be included to mitigate moire, scattering, and reflections.

Laboratory measurement of the Jones matrices characterizing the display panels, together with a modified image formation model, may be used to minimize artifacts.

Holographic diffusers may be included to mitigate moire. Fresnel lenses may be added to extend the depth of field.

Conventional LCD panels can be replaced with displays that behave as polarization rotators. Alternatively, additional optical elements (e.g., compensation films) may be added to produce a similar result. For example, panels 201, 203, 205, 207 in FIG. 2 may comprise displays that behave as polarization rotators, or may include additional optical elements, such as compensation films, to produce a similar result.

A frequency-domain analysis of polarization fields may yield an analytic depth of field expression.

Alternatively, to expand the degrees of freedom, time-multiplexed, multi-layer decompositions may be used.

Consider the multi-valued, periodic target polarization field given by Equation 3. In a prototype implementation, only the principal value of this expression is considered, limiting the target polarization field to $\theta(u,a)\epsilon[0,\pi/2]$. If this restriction is lifted, additional degrees of freedom are accessible; for example, larger rotations can decrease the intensity of an emitted ray via application of Malus' law.

Panels can be used that apply positive and negative rotations over the full range such that $\phi_k(\xi)\epsilon[-\pi,\pi]$, where $\xi=u+(d_k/d_r)a$ (see FIG. 3). This may increase reconstruction fidelity and may enable efficient, unconstrained optimization methods.

This invention may be implemented as a method comprising, in combination: (a) using an illumination source to provide light that is transmitted through at least (i) a stack of polarization rotators and (ii) a polarizer; and (b) using one or more processors (i) to perform an optimization calculation to compute a set of polarization state rotations induced in the light at respective pixels of the polarization rotators; and (ii) to output control signals to control the polarization state rotations induced in the light at the respective pixels; wherein (I) each of the polarization rotators is a layer in the stack, (II) the polarizer is optically in front of the stack, (III) each of the polarization rotators comprises a spatially addressable device, the device being configured to dynamically vary per pixel polarization state rotations induced in the light, and (IV) for each respective light ray in a set of light rays, the optimization calculation includes computing a summation of changes to polarization state rotation of the respective light ray that occur as the respective light ray travels through the stack of polarization rotators. Furthermore: (1) the optimization calculation may include computing, according to Malus' law, an intensity of the respective light ray, the intensity being as of when the respective light ray emerges from the polarizer; (2) Malus' law includes a term that is a square of a sinusoidal function, the sinusoidal function has an argument, and the optimization calculation may include solving for the argument, using an approximation based on only a single period of the sinusoidal function; (3) each of the polarization rotators may comprise a layer of liquid crystal; (4) each of the polarization rotators may be monochromatic and the illumination source may be a strobe backlight configured to sequentially illuminate the polarization rotators with varying colors of light; (5) each of the polarization rotators, respectively, may be configured to dynamically vary voltage applied at the respective pixels in order to control polarization state rotation induced in the light at the respective pixels; (6) the optimization calculation may be a constrained linear least squares optimization calculation; (7) the one or more processors may be configured to employ a SART technique when performing the optimization calculation; (8) the set of polarization state rotations, which may be computed by the optimization calculation, may minimize error between a light field transmitted from the polarizer and a light field that would be created by a target 3D scene; and (9) light emerging from the polarizer may produce an automultiscopic display.

In some implementations of this invention: (a) for a least one pair of adjacent polarization rotators in the stack, no polarizer is positioned between the pair; or (b) the optimization calculation performed by the one or more processors does not perform operations on values that are indicative of per pixel attenuation of the light and that are for pixels in a polarization rotator other than the front polarization rotator in the stack.

This invention may be implemented as apparatus comprising, in combination: (1) a stack of polarization rotators, each of the polarization rotators being a layer in the stack; (2) a polarizer, the polarizer being optically in front of the stack; (3) an illumination source, the illumination source being configured to provide light that is transmitted through at least the stack and the polarizer; and (4) one or more processors; wherein (a) the one or more processors are configured (i) to perform an optimization calculation to compute a set of polarization state rotations induced in the light at respective pixels of the polarization rotators, and (ii) to output control signals to control the polarization state rotations induced in the light at the respective pixels, (b) each of the polarization rotators comprises a spatially addressable device, the device being configured to dynamically vary per pixel polarization state rotations induced in the light, and (c) for each respective light ray in a set of light rays, the optimization calculation includes computing a summation of changes to polarization state rotation of the respective light ray that occur as the respective light ray travels through the stack of polarization rotators. Furthermore: (1) the optimization calculation may include computing, according to Malus' law, an intensity of the respective light ray, the intensity being as of when the respective light ray emerges from the polarizer; (2) Malus' law includes a term that is a square of a sinusoidal function, the sinusoidal function has an argument, and the optimization calculation may include solving for the argument, using an approximation based on only a single period of the sinusoidal function; (2) the set of polarization state rotations, which may be computed by the optimization calculation, may minimize error between a light field transmitted from the polarizer and a light field that would be created by a target 3D scene; (3) each of the polarization rotators may be monochromatic and the illumination source may be a strobe backlight configured to sequentially illuminate the polarization rotators with varying colors of light; and (4) the optimization calculation may be a linear optimization calculation and the one or more processors may be configured to employ a SART technique when performing the linear optimization calculation.

It is to be understood that the methods and apparatus that are described above and below are merely illustrative applications of the principles of the invention. Numerous modifications may be made by those skilled in the art without departing from the scope of the invention.

The following is a computer programming listing (in pseudocode) for an algorithm that employs SART. The algorithm is used in an illustrative implementation of this invention:

Computer Programming Listing:

```
variables    FBO_LF[N], FBO_LF_TMP[N], FBO_LAYERS[K], FBO_W[N],
             FBO_V[K], DEPTH[K]
function displayLoop( )
        if not initialized
                initialize all FBO_W, FBO_V
        end
        drawLightField( );
        runSART( );
        drawReconstructedLayers( );
end
function drawLightField( )
        for all light field views i
                activate FBO_LF[i]
                set perspective i
                drawScene( ); // render desired 3D scene (e.g., a teapot)
        end
end
function runSART( )
        for all iterations k
        // 1. compute Ax^(k)
                for all light field views i
                        activate FBO_LF_TMP[i]
                        enable BLEND_MODE
                        set perspective i
                        for all layers l
                                draw 2D plane at DEPTH[l] textured with
                                FBO_LAYERS[l]
                        end
                end
                // 2. given Ax^(k), compute W (b − Ax^(k))
                for all light field views i
                        activate FBO LF TMP[i]
                        activate CG_SHADER_MULTIPLY_SUBTRACT(FBO_W[i],
                        FBO_LF[i],FBO_LF_TMP[i])
                        draw orthographic 2D plane with normalized texcoords
                end
                // 3. given W (b − Ax^(k)), compute VA^T (W (b − Ax^(k)))
                for all layers l
                        activate FBO_LAYER[l]
                        activate BLEND_MODE
                        for all light field views i
                                set projective texture to perspective i
                                activate CG_SHADER_MULTIPLY(FBO_V[l],FBO
                                LAYER[l])
                                draw orthographic 2D plane with automatic texcoord generation
                        end
                end
                // 4. enforce constraints by clamping values outside feasible range
                for all layers l
                        activate FBO_LAYER[l]
                        activate CG_SHADER_CLAMP(FBO_LAYER[l])
                        draw orthographic 2D plane textured with FBO_LAYER[l]
                end
        end
end
function draw ReconstructedLayers( )
        for all layers l
                set viewport for display 1
                draw orthographic 2D plane textured with FBO_LAYERS[l]
        end
end
```

What is claimed is:

1. A method comprising, in combination:
(a) using an illumination source to provide light that is transmitted through at least (i) a stack of polarization rotators and (ii) a polarizer; and
(b) using one or more processors
(i) to perform an optimization calculation to compute a set of polarization state rotations induced in the light at respective pixels of the polarization rotators; and
(ii) to output control signals to control the polarization state rotations induced in the light at the respective pixels;

wherein
(I) each of the polarization rotators is a layer in the stack,
(II) the polarizer is optically in front of the stack,
(III) each of the polarization rotators comprises a spatially addressable device, the device being configured to dynamically vary per pixel polarization state rotations induced in the light, and
(IV) for each respective light ray in a set of light rays, the optimization calculation includes computing a summation of changes to polarization state rotation of the respective light ray that occur as the respective light ray travels through the stack of polarization rotators.

2. The method of claim 1, wherein the optimization calculation includes computing, according to Malus' law, an intensity of the respective light ray, the intensity being as of when the respective light ray emerges from the polarizer.

3. The method of claim 2, wherein (a) Malus' law includes a term that is a square of a sinusoidal function; (c) the sinusoidal function has an argument; (c) the optimization calculation includes solving for the argument, using an approximation based on only a single period of the sinusoidal function.

4. The method of claim 1, wherein for at least one pair of adjacent polarization rotators in the stack, no polarizer is positioned between the pair.

5. The method of claim 1, wherein the optimization calculation does not perform operations on values that are indicative of per pixel attenuation of the light and that are for pixels in a polarization rotator other than the front polarization rotator in the stack.

6. The method of claim 1, wherein each of the polarization rotators comprises a layer of liquid crystal.

7. The method of claim 1, wherein each of the polarization rotators is monochromatic and the illumination source is a strobe backlight configured to sequentially illuminate the polarization rotators with varying colors of light.

8. The method of claim 1, wherein each of the polarization rotators, respectively, is configured to dynamically vary voltage applied at the respective pixels in order to control polarization state rotation induced in the light at the respective pixels.

9. The method of claim 1, wherein the optimization calculation is a constrained linear least squares optimization calculation.

10. The method of claim 1, wherein the one or more processors are configured to employ a SART technique when performing the optimization calculation.

11. The method of claim 1, wherein the set of polarization state rotations, which is computed by the optimization calculation, minimizes error between a light field transmitted from the polarizer and a light field that would be created by a target 3D scene.

12. The method of claim 1, wherein light emerging from the polarizer produces an automultiscopic display.

13. Apparatus comprising, in combination:
a stack of polarization rotators, each of the polarization rotators being a layer in the stack;
a polarizer, the polarizer being optically in front of the stack;
an illumination source, the illumination source being configured to provide light that is transmitted through at least the stack and the polarizer; and
one or more processors;
wherein
(a) the one or more processors are configured
(i) to perform an optimization calculation to compute a set of polarization state rotations induced in the light at respective pixels of the polarization rotators, and
(ii) to output control signals to control the polarization state rotations induced in the light at the respective pixels,
(b) each of the polarization rotators comprises a spatially addressable device, the device being configured to dynamically vary per pixel polarization state rotations induced in the light, and
(c) for each respective light ray in a set of light rays, the optimization calculation includes computing a summation of changes to polarization state rotation of the respective light ray that occur as the respective light ray travels through the stack of polarization rotators.

14. The apparatus of claim 13, wherein the optimization calculation includes computing, according to Malus' law, an intensity of the respective light ray, the intensity being as of when the respective light ray emerges from the polarizer.

15. The apparatus of claim 14, wherein (a) Malus' law includes a term that is a square of a sinusoidal function; (c) the sinusoidal function has an argument; (c) the optimization calculation includes solving for the argument, using an approximation based on only a single period of the sinusoidal function.

16. The apparatus of claim 13, wherein for at least one pair of adjacent polarization rotators in the stack, no polarizer is positioned between the pair.

17. The apparatus of claim 13, wherein the optimization calculation does not perform operations on values that are indicative of per pixel attenuation of the light and that are for pixels in a polarization rotator other than the front polarization rotator in the stack.

18. The apparatus of claim 13, wherein the set of polarization state rotations, which is computed by the optimization calculation, minimizes error between a light field transmitted from the polarizer and a light field that would be created by a target 3D scene.

19. The apparatus of claim 13, wherein each of the polarization rotators is monochromatic and the illumination source is a strobe backlight configured to sequentially illuminate the polarization rotators with varying colors of light.

20. The apparatus of claim 13, wherein the optimization calculation is a linear optimization calculation and the one or more processors are configured to employ a SART technique when performing the linear optimization calculation.

* * * * *